United States Patent
Tillery

(10) Patent No.: US 8,220,275 B2
(45) Date of Patent: Jul. 17, 2012

(54) INLET BLEED HEAT SYSTEM THERMAL LAG MITIGATION USING COMPRESSOR INTERSTAGE BLEEDS

(75) Inventor: Steven William Tillery, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 790 days.

(21) Appl. No.: 12/353,543

(22) Filed: Jan. 14, 2009

(65) Prior Publication Data

US 2010/0175388 A1   Jul. 15, 2010

(51) Int. Cl.
*F02C 7/26* (2006.01)
(52) U.S. Cl. ............... 60/778; 60/39.092; 60/39.093; 60/785; 60/786
(58) Field of Classification Search .............. 60/784, 60/785, 778, 786, 39.092, 39.093, 806
See application file for complete search history.

(56) References Cited

U.S. PATENT DOCUMENTS

| 3,487,993 | A | * | 1/1970 | Rannenberg | 60/785 |
| 5,473,898 | A | * | 12/1995 | Briesch | 60/646 |
| 5,560,195 | A | * | 10/1996 | Anderson et al. | 60/785 |
| 6,027,304 | A | * | 2/2000 | Arar et al. | 415/116 |
| 6,328,526 | B1 | * | 12/2001 | Seki et al. | 415/1 |
| 6,378,284 | B1 | * | 4/2002 | Utamura | 60/775 |
| 7,121,078 | B2 | * | 10/2006 | Turco et al. | 60/224 |
| 7,124,591 | B2 | * | 10/2006 | Baer et al. | 60/786 |
| 2007/0204625 | A1 | * | 9/2007 | Thatcher et al. | 60/785 |

* cited by examiner

*Primary Examiner* — Ehud Gartenberg
*Assistant Examiner* — Lorne Meade
(74) *Attorney, Agent, or Firm* — Cantor Colburn LLP

(57) ABSTRACT

A system to mitigate thermal lag of start-up operations of a gas turbine is provided and includes a housing which is disposed upstream from and which is fluidly coupled to a compressor of the gas turbine, a first system coupled to an aft portion of the compressor and to the housing which, when activated, receives a first air supply from the compressor and delivers the first air supply to the housing, and a second system, coupled to the first system, which removes a second air supply from an intermediate portion of the compressor and delivers the second air supply to the first system prior to the activation of the first system.

15 Claims, 1 Drawing Sheet

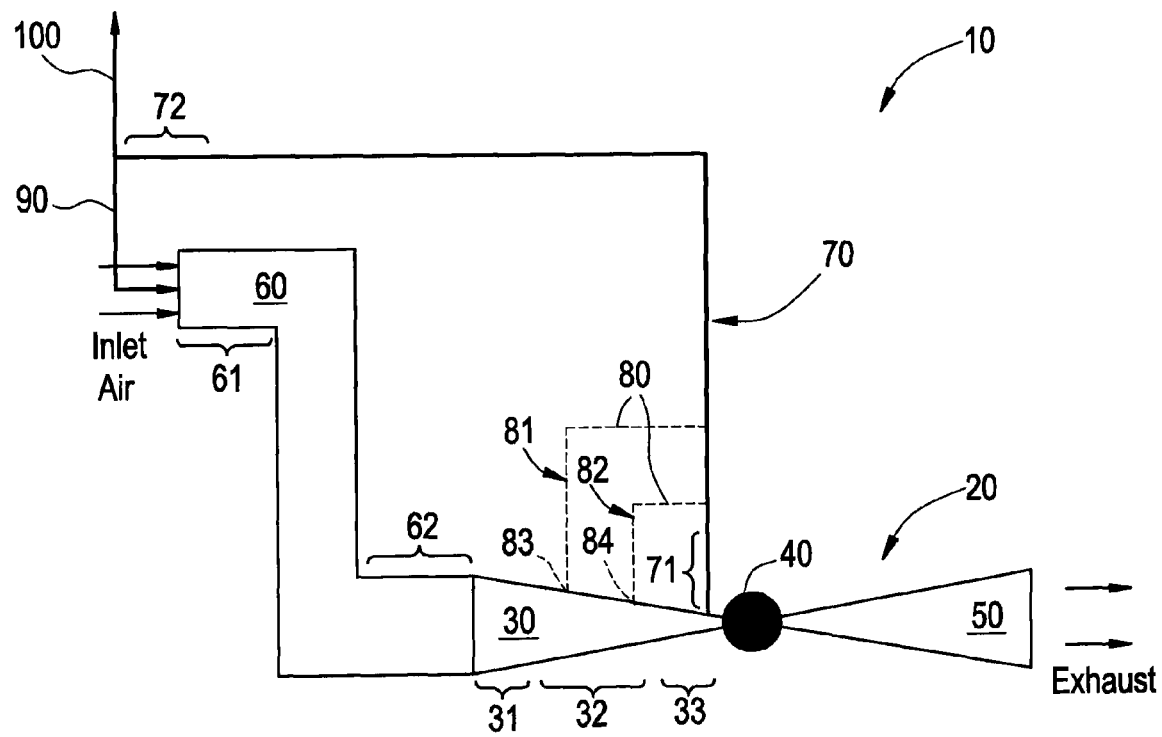

8,220,275 B2

INLET BLEED HEAT SYSTEM THERMAL LAG MITIGATION USING COMPRESSOR INTERSTAGE BLEEDS

BACKGROUND OF THE INVENTION

Aspects of the present invention are directed to thermal lag mitigation in gas turbines using inlet bleed heat (IBH) systems and compressor interstage bleeds.

Typically, in a gas turbine, including a compressor, a combustor and a turbine, start bleed or interstage bleed air is removed from the compressor to regulate compressor loads during start-up operations and dumped into the gas turbine exhaust downstream of the turbine. Also, an IBH system is employed at a late stage of the start-up operations to remove hot air from an aft portion of the compressor and to subsequently deliver the hot air to a filter housing upstream from the compressor for recirculation through the compressor.

Generally, the IBH system includes relatively large quantities of piping, valves, manifolds, etc., all of which are usually metallic. As such, when the IBH system is cold, a considerable amount of time may be required for the IBH system to heat-up once the IBH system is activated and, while the IBH system absorbs heat from the compressor flow, the inlet temperature of the compressor air is changing with time. For some units, once a cold IBH system has been activated, nearly 30 minutes may be required for the compressor inlet air to reach a steady temperature. This issue becomes more significant when the gas turbine is placed in an extremely cold environment. In these cases, the start-up schedule may have to be altered to account for the thermal lag and, thus, control complexity must be increased with turndown capability reduced. Indeed, it has been seen recently, that control strategies have been significantly hampered in having to account for thermal lags in the IBH system.

As an additional matter, it has been observed that there is a lack of mixing in the exhaust stream once the start bleed air is reintroduced into the exhaust stream. This lack of mixing results in temperature gradients in, e.g., the associated heat recovery steam generator (HRSG) that can be unfavorable. Also, the staging of the IBH system and the start bleeds tends to cause undesirable transient airflow shifts in the combustor.

BRIEF DESCRIPTION OF THE INVENTION

According to one aspect of the invention, a system to mitigate thermal lag of start-up operations of a gas turbine is provided and includes a housing which is disposed upstream from and which is fluidly coupled to a compressor of the gas turbine, a first system coupled to an aft portion of the compressor and to the housing which, when activated, receives a first air supply from the compressor and delivers the first air supply to the housing, and a second system, coupled to the first system, which removes a second air supply from an intermediate portion of the compressor and delivers the second air supply to the first system prior to the activation of the first system.

According to another aspect of the invention, a system to mitigate thermal lag of start-up operations of a gas turbine, including a compressor and a housing disposed upstream from and fluidly coupled to the compressor, is provided and includes an inlet bleed heat (IBH) system coupled to an extraction point at an aft portion of the compressor at a first end thereof and to the housing at a second end thereof which, when activated, receives a first air supply from the compressor and delivers the first air supply to the housing, and an interstage bleed system, coupled to the IBH system proximate to the first end thereof, which removes a second air supply from an intermediate portion of the compressor, which is forward from the aft portion thereof, and delivers the second air supply to the IBH system proximate to the extraction point prior to the activation of the IBH system.

According to yet another aspect of the invention, a method of mitigating thermal lag of start-up operations of a gas turbine, including a compressor and a housing disposed upstream from and fluidly coupled to the compressor, is provided and includes initiating an operation of the compressor, removing warming air from an intermediate portion of the compressor, delivering the warming air to an inlet bleed heat (IBH) system proximate to a first end thereof, which is coupled to an aft portion of the compressor at the first end and to the housing at a second end thereof, and activating the IBH system to receive a hot air supply from the compressor and to deliver the hot air supply to the housing.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of an exemplary gas turbine according to embodiments of the invention.

The detailed description explains embodiments of the invention, together with advantages and features, by way of example with reference to the drawings.

DETAILED DESCRIPTION OF THE INVENTION

With reference to FIG. 1, a system 10 to mitigate thermal lag of start-up operations of a gas turbine 20 is provided. The gas turbine 20 may have various constructions and configurations but generally includes a compressor 30 in which inlet air is compressed and heated, a combustor 40 downstream from the compressor 30, which receives compressed heated air from the compressor 30 for combustion operations, and a turbine 50 downstream from the combustor 40 in which turbine blades, which are powered by the combustion in the combustor 40, rotate and generate power. Exhaust from the turbine 50 is expelled and directed in many cases to a heat recovery steam generator (HRSG) in which the heat of the exhaust is employed in steam generation and thereby additional power generation.

The system 10 includes a housing 60, which is disposed upstream from and which is fluidly coupled to the compressor 30. A first system 70 is coupled, at a first end 71 thereof, to an extraction point (located at the intersection of the first system 70 and the compressor 30) at an aft portion 33 of the compressor 30 and, at a second end 72 thereof, to the housing 60. When activated, the first system 70 receives a first air supply, such as a hot air supply, from the compressor 30 and delivers the first air supply to the housing 60.

A second system 80 is coupled to the first end 71 of the first system 70. The second system 80 removes a second air supply, such as a supply of warming air, from an intermediate portion 32 of the compressor 30 and delivers the second air supply to the first system 70 prior to the activation of the first system 70. In an embodiment, the second air supply is delivered to the first end 71 of the first system 70 proximate to the extraction point of the aft portion 33 of the compressor 30.

In this way, the first system 70, which includes piping, valves, manifolds, etc., is warmed by the warming air of the second air supply. Thus, the thermal lag resulting from the need for the first system 70 to heat up following its activation is mitigated and relatively warm or hot air may be delivered to the housing 60 by the first system 70 relatively quickly following its activation. Moreover, since the first system 70 is generally well insulated, the warmth provided thereto by the warming air is maintained for a relatively long period of time. In addition, the activation of each of the first and second systems 70 and 80 may be staged in such as way as to substantially reduce a tendency for transient airflow shifts to be created in the compressor 30.

The housing 60 may include a filter housing or any other suitable housing configuration. In any case, the housing 60 may further include an inlet 61 to which the second end 72 of the first system 70 is coupled and into which inlet air from the atmosphere enters the gas turbine 20. In addition, the housing 60 may also include an outlet 62 by which the housing 60 fluidly communicates with an inlet 31 of the compressor 30.

The first system 70 may include an inlet bleed heat (IBH) system, including relatively large quantities of piping, valves, manifolds, etc., as described above. In this case, the IBH system may be activated when the gas turbine 20 operates at a preselected percentage of its rated speed, such as about 95% of its rated speed. Of course, as mentioned above, the activation of the IBH system may be conducted at various gas turbine 20 operational speeds in accordance with local and/or current requirements.

The second system 80 may be configured with multiple branches, such as branches 81 and 82, as shown in FIG. 1, and removes the second air supply from multiple axial locations 83 and 84 of the intermediate portion 32 of the compressor 30. While the intermediate portion 32 of the compressor 30 may be located at various axial locations of the compressor 30, it is understood that the intermediate portion 32 will generally be forward, along the axis of the compressor 30, from the aft portion 33 of the compressor 30.

The second system 80 may includes a start or, rather, an interstage bleed system, which is configured to remove the second air supply from the intermediate portion 32 of the compressor 30 so as to regulate a compressor load of the compressor 30. The interstage bleed system may operate when the gas turbine 20 operates at 0 to at least a preselected percentage of its rated speed, such as, again, at least about 95% of its rated speed. Of course, again, the operation of the interstage bleed system may be conducted at various gas turbine 20 operational speeds in accordance with local and/or current requirements.

Moreover, where the respective operational speeds of the gas turbine 20 at which the IBH system and the interstage bleed system are each activated and/or deactivated are similar, in accordance with embodiments of the present invention, staging of the system activations/deactivations may be configured so as to substantially reduce a tendency for transient airflow shifts to be created in the compressor 30.

Once delivered to the first system 70, the second air supply may be delivered by first piping 90 to the housing 60, at, e.g., the inlet 61, via the second end 72 of the first system 70. In an alternative embodiment, the second air supply may be vented by second piping 100 to the atmosphere surrounding the gas turbine 20.

In accordance with another embodiment of the invention, a method of mitigating thermal lag of start-up operations of a gas turbine 20, including a compressor 30 and a housing 60 disposed upstream from and fluidly coupled to the compressor 30, is provided. The method includes initiating an operation of the compressor 30, removing warming air from an intermediate portion 32 of the compressor 30, delivering the warming air to an inlet bleed heat (IBH) system proximate to a first end 71 thereof, which is coupled to an aft portion 33 of the compressor 30 at the first end 71 and to the housing 60 at a second end 72 thereof, and activating the IBH system to receive a hot air supply from the compressor 30 and to deliver the hot air supply to the housing 60.

The warming air may be delivered to the housing 60 or, alternatively, to the atmosphere surrounding the gas turbine 20. Also, the removing of the warming air from the intermediate portion 32 of the compressor 30 and the activating of the IBH system are each conducted when the gas turbine 10 operates at 0 to at least about a preselected percentage of its rated speed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system to mitigate thermal lag of start-up operations of a gas turbine, the system comprising:
    a housing which is disposed upstream from and which is fluidly coupled to a compressor of the gas turbine;
    a first system coupled at a first end thereof to an extraction point at an aft portion of the compressor and at a second end thereof to the housing which is configured to receive, when activated, a first air supply from the compressor and to deliver the first air supply to the housing; and
    a second system, coupled to the first system proximate to the first end of the first system at an axial location of the extraction point, which is configured to removes a second air supply from an intermediate portion of the compressor and to deliver the second air supply to the first system at the axial location of the extraction point prior to the activation of the first system.

2. The system according to claim 1, wherein the housing comprises a filter housing including an inlet to which the first system is coupled and an outlet by which the filter housing fluidly communicates with the compressor.

3. The system according to claim 1, wherein the first system comprises piping warmed by the second air supply prior to the activation of the first system.

4. The system according to claim 1, wherein the first system comprises an inlet bleed heat (IBH) system.

5. The system according to claim 1, wherein the second system removes the second air supply from multiple axial locations of an intermediate portion of the compressor, the intermediate portion being located forward from an aft portion.

6. The system according to claim 1, wherein the second system comprises an interstage bleed system.

7. The system according to claim 6, wherein the interstage bleed system removes the second air supply from the intermediate portion of the compressor to regulate a compressor load.

8. The system according to claim 1, wherein the second air supply is delivered to the housing via the first system.

9. The system according to claim 1, wherein the second air supply is vented to atmosphere surrounding the gas turbine via the first system.

10. The system according to claim 1, wherein the first system comprises:
- a radially oriented extraction component, which extends substantially along a radial dimension from the first end of the first system;
- an axially oriented delivery component, which is disposed downstream from the radially oriented extraction component, which extends substantially along an axial dimension transverse to the radial dimension, and which terminates with the second end of the first system; and
- a connection by which the extraction component and the delivery component are fluidly coupled with one another.

11. The system according to claim 10, wherein the second system delivers the second air supply to the first system along the radially oriented extraction component.

12. A system to mitigate thermal lag of start-up operations of a gas turbine, including a compressor and a housing disposed upstream from and fluidly coupled to the compressor, the system comprising:
- an inlet bleed heat (IBH) system coupled to an extraction point at an aft portion of the compressor at a first end thereof and to the housing at a second end thereof which is configured to receive, when activated, a first air supply from the compressor and to deliver the first air supply to the housing; and
- an interstage bleed system, coupled to the IBH system proximate to the first end thereof at an axial location of the extraction point, which is configured to remove a second air supply from an intermediate portion of the compressor, which is forward from the aft portion thereof, and to deliver the second air supply to the IBH system proximate to the axial location of the extraction point prior to the activation of the IBH system.

13. A method of mitigating thermal lag of start-up operations of a gas turbine, including a compressor and a housing disposed upstream from and fluidly coupled to the compressor, the method comprising:
- initiating an operation of the compressor;
- removing warming air from an intermediate portion of the compressor;
- delivering the warming air to an inlet bleed heat (IBH) system proximate to a first end thereof, the IBH system being coupled to an aft portion of the compressor at the first end thereof and to the housing at a second end thereof; and
- activating the IBH system to receive a hot air supply from an extraction point at the aft end of the compressor and to deliver the hot air supply to the housing,
- the delivering of the warming air to the IBH system being conducted at an axial location of the extraction point and prior to the activating.

14. The method according to claim 13, further comprising delivering the warming air to the housing.

15. The method according to claim 13, further comprising venting the warming air to an atmosphere surrounding the gas turbine.

* * * * *